United States Patent [19]
Wright

[11] Patent Number: 5,601,262
[45] Date of Patent: Feb. 11, 1997

[54] CABLE LOCATOR

[75] Inventor: John O. Wright, York, Pa.

[73] Assignee: Osram Sylvania Inc., Danvers, Mass.

[21] Appl. No.: 688,569

[22] Filed: Jul. 30, 1996

Related U.S. Application Data

[63] Continuation of Ser. No. 412,628, Mar. 29, 1995, abandoned.

[51] Int. Cl.$^6$ ..................................................... F16L 3/08
[52] U.S. Cl. ......................................... 248/74.4; 248/74.1
[58] Field of Search .................................. 248/74.4, 74.1, 248/73, 71

[56] References Cited

U.S. PATENT DOCUMENTS

| | | | |
|---|---|---|---|
| 2,454,064 | 11/1948 | Johnson | 248/74.4 |
| 2,625,354 | 1/1953 | Smith | 248/74.4 X |
| 4,429,497 | 2/1984 | Dibernardi | 248/74.4 X |
| 4,669,688 | 6/1987 | Itoh et al. | 248/74.2 |
| 4,763,132 | 8/1988 | Juds et al. | 248/74.2 X |
| 5,161,759 | 11/1992 | Burns et al. | 248/74.2 X |
| 5,316,245 | 5/1994 | Ruckwardt | 248/74.2 X |

FOREIGN PATENT DOCUMENTS 2142376  6/1984  United Kingdom .................. 248/74.2

Primary Examiner—Philip C. Kannan
Attorney, Agent, or Firm—William H. McNeill

[57] ABSTRACT

A cable locator is provided which includes a base, having a cable-receiving channel formed therein, and a cover which is releasably attached to the base. A locating element forms a part of the base or the cover for attaching the cable locator to an anchor point of a support surface. The cable locator is particularly useful in securing one or more automobile cables to an anchoring point.

8 Claims, 4 Drawing Sheets

CABLE LOCATOR

This is a continuation of application Ser. No. 08/412,628, filed on Mar. 29, 1995 now abandoned.

BACKGROUND OF THE INVENTION

1. Field of the Invention

The present invention relates to a cable locator which is useful in quickly connecting a cable thereto and also quickly connecting the cable locator to a support surface such as, for example, a support surface of an automobile.

2. Description of prior Art

Cable locators known in the art are typically pre-molded components, having various geometries, which are attached to cables, such as automobile cables, to fix the cables in place relative to an anchor point located at a support surface. In use, a cable is fastened to the cable locator by means of tape and the cable locator is then attached to the support surface at an anchor point. Taping a cable to a cable locator is a time consuming and costly operation. In addition, to the extent that the tape is not properly applied there will be a tendency for the cable to move relative to the cable locator and possibly to be separated therefrom.

SUMMARY OF THE INVENTION

It is, therefore, an object of the present invention to provide a cable locator which may be readily and inexpensively attached to a support surface.

It is another object of the present invention to provide such a cable locator to which a cable may be attached without the use of tape.

Another object of the present invention is to provide such a cable locator which is simple to use.

Yet another object of the present invention is to provide such a cable locator to which a cable may be firmly attached.

It is a further object of the present invention to provide such a cable locator wherein a cable attached thereto does not move in an axial or rotational direction relative to the cable locator.

There objects are achieved, in one aspect of the invention, by providing a cable locator comprising a base having a first surface, an opposite second surface, and a cable-receiving channel formed by the first surface. The cable-receiving channel extends in the direction of a longitudinal axis. A cover is provided which is releasibly attachable to the base for enclosing the cable-receiving channel in a closed mode and exposing the cable-receiving channel in an open mode. A locating element forming a part of the base or the cover is also provided. In use, one or more cables are enclosed within the cable-receiving channel and held firmly in place by the cover, and the cable locator is attached to a support surface by means of the locating element.

BEST MODE FOR CARRYING OUT THE INVENTION

Figure 1:
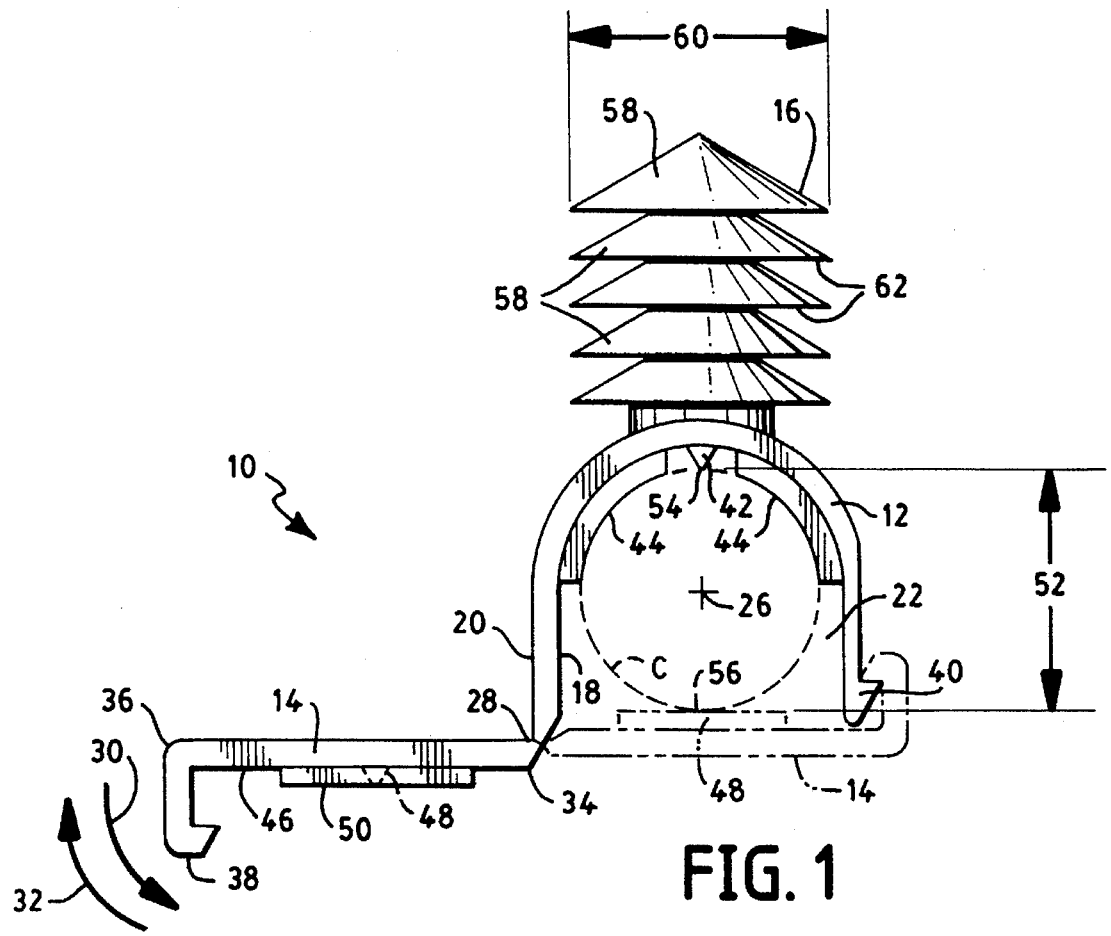
FIG. 1 is an elevational view of a cable locator of an embodiment of the invention shown in an open mode and a closed mode.
Figure 2:
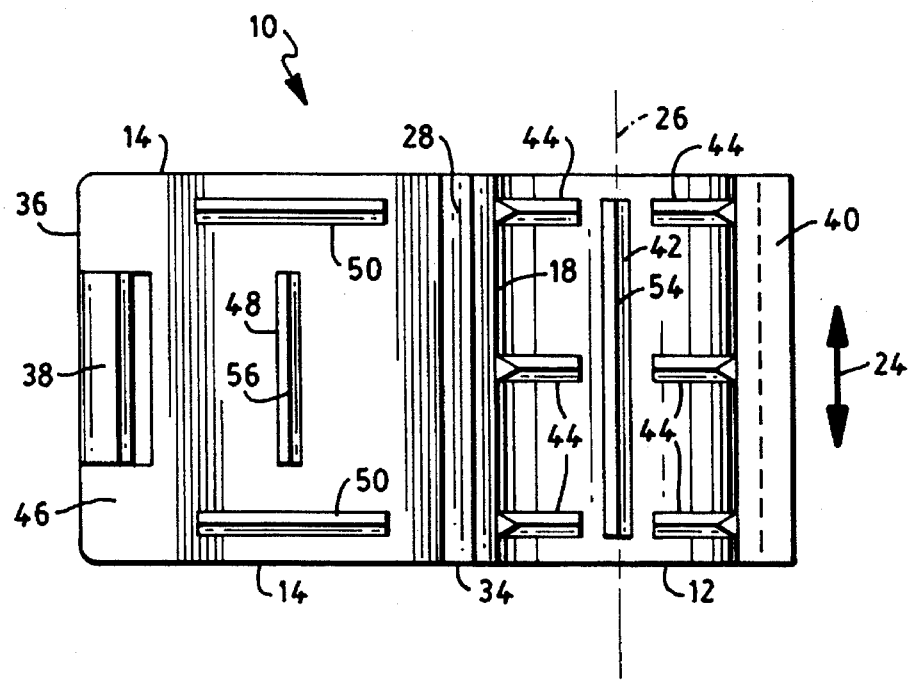
FIG. 2 is a plan view of the cable locator of FIG. 1 in an open mode.

The embodiment of this invention which is illustrated in FIGS. 1 and 2 is particularly suited for achieving the objects of this invention. FIGS. 1 and 2 depict a cable locator 10 which includes a base 12, a cover 14 and a locating element 16. Base 12 includes a first surface 18 and an opposite second surface 20. A cable-receiving channel 22 is formed by the first surface 18 and extends in the direction 24 of a longitudinal axis 26 of the cable locator 10.

The cover 14 is pivotally attached to the base 12 at web 28 such that the cover may be rotated in the direction of arrow 30 to a closed position in a closed mode, shown in phantom lines in FIG. 1, and in the direction of arrow 32 to an open position in an open mode, shown by solid lines. Cover 14 is releasably attachable to the base 12 for enclosing the cable-receiving channel 22 in the closed mode and for exposing the cable-receiving channel 22 in the open mode. For example, in the embodiment of FIGS. 1 and 2, the cover includes a first end 34 which is pivotally attached to the base 12 at the web 28 and an opposite second end 36 which includes a first latch member 38. Base 12 includes a second latch member 40 which mates with latch member 38 in a conventional manner to form a snap-fit when the cover 14 is in the closed mode.

In the preferred embodiment, the surface 18 of the cable-receiving channel 22 comprises at least one protuberance which protrudes towards longitudinal axis 26. In the embodiment of FIGS. 1 and 2, a first protuberance 42 is provided which extends in the direction 24 of longitudinal axis 26, and a plurality of second protuberances 44 are provided which extend in a circumferential direction relative to longitudinal axis 26. Similarly, the cover 14 includes an inner surface 46 which comprises at least one protuberance which extends away from surface 46, and towards the longitudinal axis 26 in the closed mode. In the embodiment of FIGS. 1 and 2, a first protuberance 48 is provided which extends in the direction 24 of longitudinal axis 26, and a plurality of second protuberances 50 are provided which extend in a direction which is normal to protuberance 48.

The locating element forms a part of the base 12 or the cover 14. For example, in the embodiment of FIGS. 1 and 2, the locating element 16 forms a part of base 12. In particular, the locating element 16 is connected to the surface 20 of base 12 and extends radially away from longitudinal axis 26 as depicted in FIG. 1.

The cover 14 may be separately attached to the base 12, and the locating element 16 may be separately attached to the cover or the base, in any conventional manner if desired. However, in the preferred embodiment, the cable clamp 10 will be molded from a thermoplastic material in a conventional manner such that the base 12, cover 14 and locating element 16 are formed as a single piece. In addition, in the preferred embodiment, when the cover 14 is in the closed mode the distance 52 between the apex 54 of protuberance 42 and the apex 56 of protuberance 48 will be less than the diameter of the cable C which is to be held in place by the cable clamp 10 as described herein.

In use, the cover 14 is placed in the open mode depicted in solid lines in FIG. 1 by pivoting the cover in the direction of arrow 32. One or more cables may then be inserted into the cable-receiving channel 22. In the embodiment of FIGS. 1 and 2, a single cable C is inserted into the cable-receiving channel 22. The cover 14 is then placed in the closed mode as depicted in phantom lines in FIG. 1 by pivoting the cover in the direction of arrow 30 until the latch members 38 and 40 mate with each other to hold the cover 14 in place relative to the base 12. Since the distance 52 is less than the diameter of the cable C, the cable will be compressed between the protuberances 42, 44 of the base 12 and the protuberances 48, 50 of the cover 14 to thereby hold the cable in place. Protuberances 42 and 48 will depress the cable C and prevent rotation of the cable relative to the cable locator 10, and protuberances 44, 50 will depress the cable and prevent movement of the cable in the direction 24 of longitudinal axis 26. The cable locator 10 may then be mounted by means of locating element 16. For example, the locating element 16 may be inserted into a mating hole at a desired anchoring point to fasten the cable locator 10 and cable C to an automobile surface, as desired. In the embodiment of FIG. 1, the locating element 16 includes a plurality of resilient cone-like members 58 having a diameter 60 which is slightly greater than the diameter of a hole into which the locating element is to be inserted. In this manner, the locating element 16 may be inserted into a hole at an anchoring point as the members 58 bend to accommodate the hole diameter. Once through the hole, the resilient members resume their original configuration such that one of the surfaces 62 will prevent the cable locator 10 from being readily removed from such anchoring point in the usual manner. It will be apparent to those skilled in the art that any other type of locating element 16 may be provided.

Figure 3:
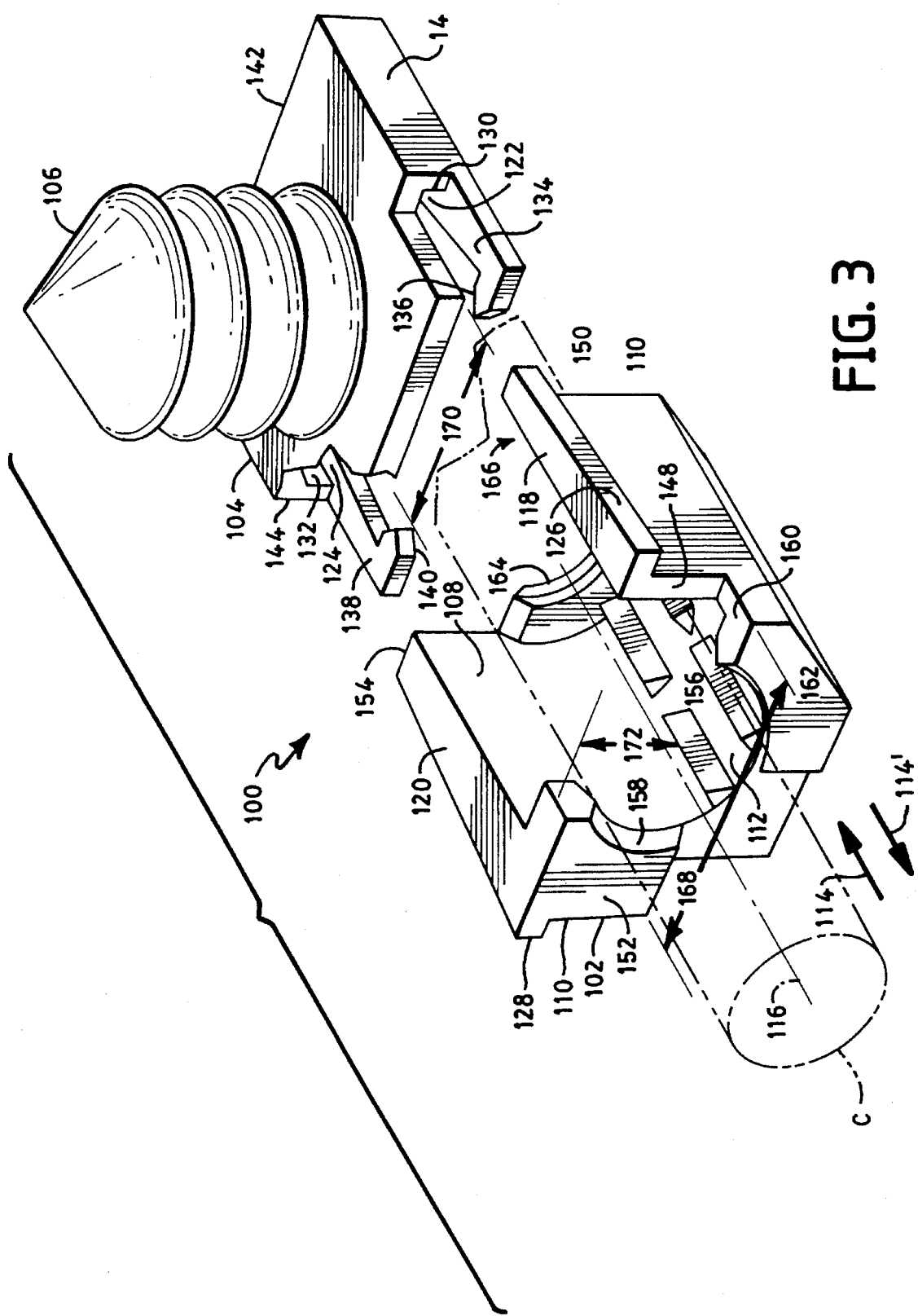
FIG. 3 is an exploded perspective view of an alternative embodiment of the cable locator of the present invention.

FIG. 3 depicts an alternative embodiment of the present invention. FIG. 3 depicts a cable locator 100 which includes a base 102, a cover 104 and a locating element 106. Base 102 includes a first or inner surface 108 and opposite second or outer surfaces 110. A cable-receiving channel 112 is formed by the first surface 108 and extends in the direction 114, 114' of a longitudinal axis 116.

The cover 104 is releasably attachable to the base 102 for enclosing the cable-receiving channel 112 in a closed mode and exposing the cable-receiving channel in an open mode.

The locating element may form a part of the base or the cover. In the embodiment of FIG. 3, the locating element 106, which is depicted by way of example as being similar to locating element 16 of the embodiment of FIG. 1, forms a part of the cover 104, the locating element being connected to an outer surface of the cover and extending radially away from the longitudinal axis 116 in the closed mode. The cable locator 100 may be mounted by means of locating element 106 in the same manner as discussed herein regarding the mounting of cable locator 10 by means of locating element 16.

In the embodiment of FIG. 3, the cover 104 is releasably attachable to the base 102 by providing mating ranged surfaces and grooves. In particular, base 102 is provided with a first ranged member 118 located at one side of the cable-receiving channel 112 and a second flanged member 120 located at an opposite second side of the cable-receiving channel. Cover 104 includes a first groove 122 at one edge of the cover and a second groove 124 at an opposite edge of the cover. In the closed mode, flanged member 118 will mate with groove 122 and flanged member 120 will mate with groove 124. Flanged member 118 includes a first tapered surface 126 and flanged member 120 includes a second tapered surface 128. Surfaces 126 and 128 extend generally in the direction 114, 114' of longitudinal axis 116. The first groove 122 comprises a first tapered base surface 130 and the second groove 124 comprises a second tapered base surface 132. In the closed mode, the tapered flanged surface 126 mates with the tapered base surface 130 and the tapered flanged surface 128 mates with the tapered base surface 132. In the preferred embodiment, groove 122 comprises a resilient leg 134 which includes a tip 136 which extends generally in the direction of groove 124 and groove 124 comprises a resilient leg 138 which includes a tip 140 which extends generally in the direction of tip 136. Legs 134 and 138 extend from a bridging member 142 which bridges opposing sides 144, 146 of cover 104. Legs 134 and 138 extend generally in the direction 114, 114' of the longitudinal axis 116 in the closed mode.

In the preferred embodiment, the flanged member 118 includes an abutment end 148 and an opposite abutment end 150. Similarly, flanged member 120 includes an abutment end 152 and an opposite abutment end 154.

In the embodiment depicted in FIG. 3, the flanged member 118 and the flanged member 120 are offset relative to each other in the direction, 114, 114' of longitudinal axis 116. Similarly, leg 134 and leg 138 are offset, relative to each other, in the direction 114, 114' of longitudinal axis 116, thereby offsetting tips 136, 140, relative to each other, in the direction 114, 114'.

In the preferred embodiment, the surface 108 which forms cable-receiving channel 112 includes at least one protuberance which protrudes towards the longitudinal axis 116. For example, in the embodiment of FIG. 3, the surface 108 includes a plurality of protuberances 156 extending in the direction 114, 114' of longitudinal axis 116. Protuberances 156 serve to prevent rotational movement of a cable C locked within the cable locator 100 as described herein. Additional protuberances may be provided to prevent movement of the cable C relative to the cable locator 100 in the direction 114, 114' of longitudinal axis 116. For example, in the embodiment of FIG. 3 the abutment end 152 comprises a protuberance 158. Similarly, abutment end 148 is extended at 160 to provide a protuberance 162 which is generally apposite to protuberance 158. In a like manner, abutment end 154 includes a protuberance 164 and abutment end 150 includes a protuberance 166 (not shown) similar to protuberance 164. The protuberances 158, 162, 164 and 166 extend in a circumferential direction relative to longitudinal axis 116. Protuberances 158 and 162 are in radial alignment with each other and protuberances 164 and 166 are in radial alignment with each other, relative to longitudinal axis 116.

In use, the cable locator 100 is placed in an open mode by removing the cover 104 from the base 102 by moving the cover relative to the base in the direction of arrow 114 thereby removing the flanged members 118, 120 from respective grooves 122, 124. Then a cable C is inserted into the cable-receiving channel 112 as depicted in the drawing. In this manner, the outer surface of the cable will be engaged by protuberances 156, 158, 162, 164 and 166. The cable locator 100 is then placed in a closed mode by inserting the flanged members 118, 120 into respective grooves 122, 124 while moving the cover relative to the base in the direction of arrow 114'. In the preferred embodiment, the distance 168 between the outer surfaces 110 of base 102 is greater than the perpendicular distance 170 between the offset tips 136 and 140 of cover 104. In this manner, when the cover 104 is being assembled with the base 102, curved ends of the tips 136, 140 will engage a respective surface 110 and be spread apart due to the resilience of the legs 134, 138. As the cover is moved in the direction 114' the offset tips 136, 140 will slide upon respective surfaces 110. By dimensioning the length of the arms 134, 138 to be slightly greater than the length of respective surfaces 110, when the abutment ends 150, 154 engage the bridging member 142, the tips 136, 140 will snap against respective abutment surfaces 148, 152 to lock the cover 104 to the base 102 in a closed mode. By dimensioning the height 172 of the cable-receiving channel 112 such that the distance 172 is slightly less than the diameter of the cable C, when the cover 104 is being attached to the base 102 the cable will be compressed between the cover and the protuberances 156 thereby causing the protuberances 156 to depress the outer surface of the cable to lock it in place to prevent the cable from rotating about axis 116. Similarly, by properly dimensioning the distance between protuberances 158 and 162, and between protuberances 164 and 166, such protuberances will also depress the outer surface of the cable C to lock it in place to prevent axial movement of the cable C relative to the cable clamp 100 in the direction 114, 114' along longitudinal axis 116.

Figure 4:
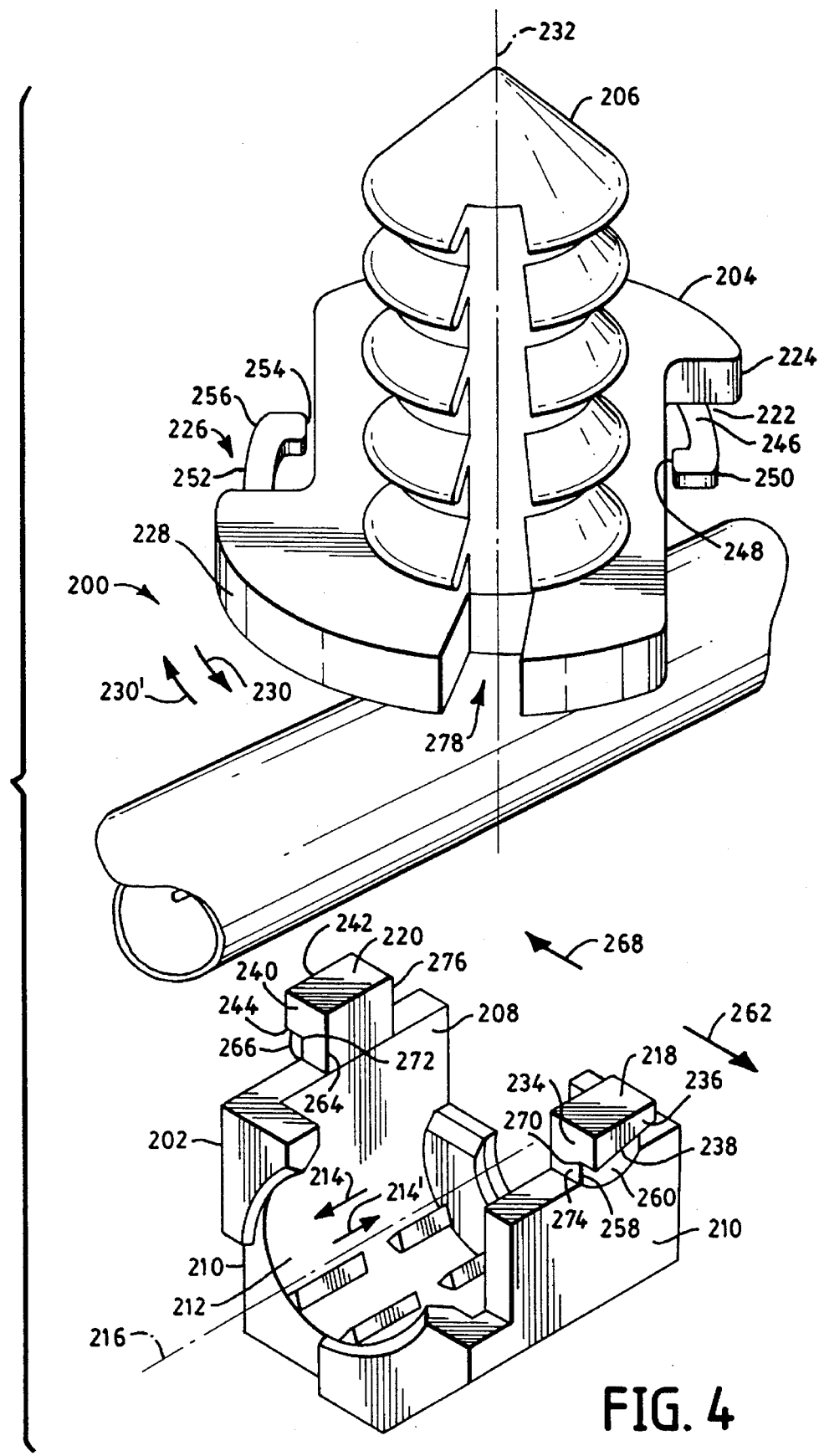
FIG. 4 is an exploded perspective view of another alternative embodiment of the cable locator of the present invention.
Figure 5:
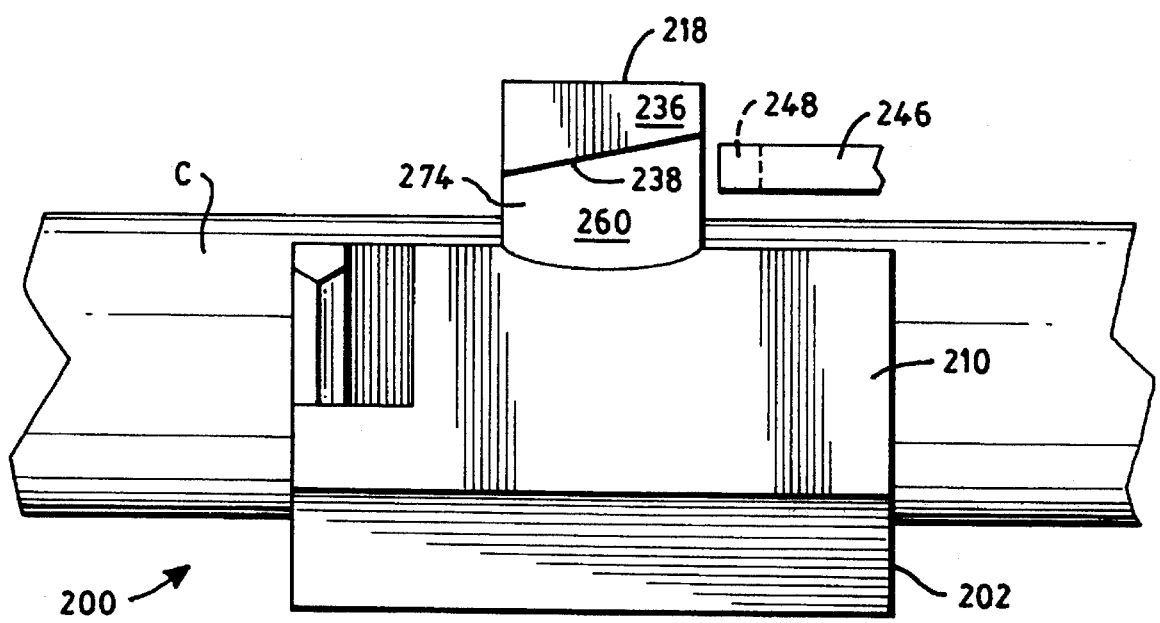
FIG. 5 is a diagramatic elevational view of the embodiment of FIG. 4.

FIGS. 4 and 5 depict another alternative embodiment of the present invention. FIG. 4 depicts a cable clamp 200 which includes a base 202, a cover 204 and a locating element 206. Base 202 includes a first surface 208 and opposite second surfaces 210. A cable-receiving channel 212 is formed by the first surface 208 and extends in the direction 214, 214' of a longitudinal axis 216. The cover 204 is releasably attachable to the base 202 for enclosing the cable-receiving channel 212 in a closed mode and exposing the cable-receiving channel in an open mode.

As in the other embodiments described herein, the locating element may form a part of the base or the cover. In the embodiment of FIG. 4, the locating element 206, which is depicted by way of example as being similar to locating element 16 of the embodiment of FIG. 1, forms a part of the cover 204, the locating element being connected to an outer surface of the Cover and extending radially away from the longitudinal axis 216 in the closed mode. The cable locator 200 may be mounted by means of locating element 206 in the same manner as described herein regarding the mounting of cable locator 10 by means of locating element 16.

Like the embodiment of FIG. 3, in the embodiment of FIGS. 4 and 5, the cover 204 is releasably attachable to the base 202 by providing mating ranged surfaces and grooves. However, whereas in the embodiment of FIG. 3 such mating is effected by reciprocal motion of the cover relative to the base, in the embodiment of FIG. 4 and 5 such mating is effected by rotational motion of the cover 204 relative to the base 202. In particular, base 202 is provided with a first flanged member 218 located at one side of the cable-receiving channel 212 and a second flanged member 220 located at an opposite second side of the cable-receiving channel. Cover 204 includes a first groove 222 at one edge 224 of the cover and a similar second groove 226 (not shown) at an opposite edge 228 of the cover. In the preferred embodiment the edges 224, 228 extend in a circumferential direction 230, 230' relative to a longitudinal axis 232 of the cover 204 and locating element 206. In the closed mode, flanged member 218 will mate with groove 222 and flanged member 220 will mate with groove 226. Flanged member 218 comprises a leg 234 having a tapered surface 236 which forms a sloping surface 238 which slopes downward in the direction 214. Flanged member 220 comprises a leg 240 having a tapered surface 242 which forms a sloping surface 244 which slopes downward (not shown) in an opposite direction 214'. Tapered surfaces 236 and 242 extend generally in the direction 214, 214' of longitudinal axis 216. Groove 222 of cover 204 comprises an arm 246 which includes a tip 248 at a distal end 250 of arm 246. Similarly, groove 226 comprises an arm 252 which includes a tip 254 at a distal end 256 of the arm 252. Arms 246 and 252 extend in circumferential direction 230, 230' relative to longitudinal axis 232 of the cover 206. Tips 248 and 254 extend in the same circumferential direction 230' as depicted in FIG. 4.

Flanged member 218 comprises another leg 258 having a camming surface 260 which is convex in a direction 262 away from flanged member 220. Similarly, flanged member 220 comprises another leg 264 having a camming surface 266 which is convex in an opposite direction 268 away from flanged member 218. The sloping surface 238 forms a junction 270 with camming surface 260, and sloping surface 244 forms a juncture 272 with camming surface 266. In the embodiment of FIG. 4, the leg 258 provides an abutment surface 274 and leg 264 provides an abutment surface 276.

With the exception of the substitution of ranged members 218, 220 of FIG. 4 for ranged members 118, 120, respectively, of FIG. 3, the base 202 is the same as the base 102 as described herein.

At least one slot is provided in the cover 204 and/or the locating element 206 for use in attaching the cover to the base 202. In the embodiment of FIG. 4, a slot 278 is provided in the cover 204 and the locating element 206. Another similar slot (not shown) is provided in the cover 204 and locating element 206 at a position located at about 180° from slot 206 measured in the direction 230 relative to axis 232. A tool (not shown) may be provided which includes a handle and two spaced prongs, extending from the handle, which may be positioned into respective slots to facilitate turning the cover 204 in the direction 230' or 230 to effect a closed or open mode, respectively, of the cable clamp as described herein. In the embodiment of FIG. 4, the slot 278 extends radially away from the axis 216 of base 202 in the closed mode.

In use, a cable C is inserted into the cable-receiving channel 212 of the disassembled cable locator 200 as depicted in the drawing. In this manner, the outer surface of the cable will be engaged by the various protuberances depicted in FIG. 4 which correspond to protuberances 156, 158, 162, 164 and 166 of the embodiment of FIG. 3. The cable locator 200 is then placed in a closed mode by inserting the ranged members 218, 220 into respective grooves 222, 226 while rotating the cover 204 relative to the base 202 in the direction of arrow 230'. In the preferred embodiment the base 202 and cover 204 will be dimensioned such that during such rotation, the tip 248 will engage the sloping surface 238 and the camming surface 260, and the tip 254 will engage the sloping surface 244 and the camming surface 266. Since the sloping surfaces 238 and 244 slope downward in opposite directions relative to axis 216, the cover 204 will be drawn downward towards the base 202 during rotation of the cover in the direction 230' thereby compressing the cable C between the cover and the protuberances to prevent rotational and axial movement of the cable relative to the cable clamp 200 in the same manner as described herein with respect to the embodiment of FIG. 3. By properly dimensioning the distance between tips 248 and 254, rotation of the cover 204 in the manner described herein will cause the tips to slide upon camming surfaces 260 and 266, respectively, until the resilience of arms 246, 252 causes tip 248 to snap into engagement with abutment surface 274 and tip 254 to snap into engagement with abutment surface 276 to lock the cover 204 to the base 202 in a closed mode.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A cable locator comprising:

a base having a first surface, at least one opposite second surface, and a cable-receiving channel formed by said first surface, said cable-receiving channel extending in the direction of a longitudinal axis of said base, said base further including a first flanged member located at one side of said cable receiving channel and a second flanged member located at an opposite second side of said cable receiving channel, said first flanged member comprising a first tapered surface and said second flanged member comprising a second tapered surface, said first tapered surface and said second tapered surface extending generally in the direction of said longitudinal axis, and further wherein said first groove comprises a first tapered base surface and said second groove comprises a second tapered base surface, said first tapered surface mating with said first tapered base surface and said second tapered surface mating with said second tapered base surface, in a closed mode, a cover releasably attachable to said base for enclosing said cable-receiving channel in said closed mode and exposing said cable-receiving channel in an open mode, and further wherein said cover includes a first groove at one edge of said cover and a second groove at an opposite edge of said cover, said first flanged member mating with said first groove and said second flanged member mating with said second groove, in said closed mode, said first groove comprising a first leg which includes a first tip which extends generally in the direction of said second groove, said second groove comprising a second leg which includes a second tip which extends generally in the direction of said first tip, said first leg and said second leg extending from a bridging member of said cover, generally in the direction of said longitudinal axis in said closed mode; and a locating element forming a part of one of said base and said cover.

2. The cable locator of claim 1 wherein said first ranged member extends between a first abutment end and a first opposite abutment end, wherein said second ranged member extends between a second abutment end and a second opposite abutment end, and wherein in said closed mode said first tip engages said first abutment end, said second tip engages said second abutment end, and said bridging member engages said first and second opposite abutment ends.

3. The cable locator of claim 1 wherein said first flanged member and said second ranged member are offset, relative to each other, in the direction of said longitudinal axis, and further wherein said first leg and said second leg are offset, relative to each other, in the direction of said longitudinal axis.

4. The cable locator of claim 3 wherein said first abutment end comprises a first protuberance and said second abutment end comprises an opposite second protuberance, and further wherein said first opposite abutment end comprises a third protuberance and said second opposite abutment end comprises an opposite fourth protuberance, each protuberance extending in a circumferential direction relative to said longitudinal axis, said first protuberance being in radial alignment with said second protuberance and said third protuberance being in radial alignment with said fourth protuberance.

5. The cable locator of claim 4 wherein said first surface comprises a plurality of protuberances which protrude towards, and extend in the direction of, said longitudinal axis.

6. The cable locator of claim 5 wherein said cover includes an outer surface and further wherein said locating element is connected to said outer surface and extends radially away from said longitudinal axis in said closed mode.

7. The cable locator of claim 1 wherein said first surface comprises at least one protuberance which protrudes towards said longitudinal axis.

8. The cable locator of claim 7 wherein said at least one protuberance comprises a plurality of protuberances which extend in the direction of said longitudinal axis.

* * * * *